United States Patent [19]

LeBlanc

[11] 4,264,802
[45] Apr. 28, 1981

[54] THERMOCOUPLE, MULTIPLE JUNCTION REFERENCE OVEN

[75] Inventor: Louis P. LeBlanc, Lancaster, Calif.

[73] Assignee: The United States of America as represented by the Administrator of the National Aeronautics and Space Administration, Washington, D.C.

[21] Appl. No.: 122,965

[22] Filed: Feb. 20, 1980

[51] Int. Cl.³ .............................................. H05B 1/00
[52] U.S. Cl. ..................................... 219/210; 73/361; 219/209; 219/510; 361/334; 236/1 F
[58] Field of Search ............... 219/209, 210, 504, 505, 219/510; 73/359 R, 369; 361/334, 379; 136/222, 235; 236/15 R, 1 F; 310/300; 330/23

[56] References Cited

U.S. PATENT DOCUMENTS

| | | |
|---|---|---|
| 2,785,860 | 3/1957 | Harrison et al. ..................... 73/361 X |
| 3,069,909 | 12/1962 | Hines ....................................... 73/361 |
| 3,244,371 | 4/1966 | Bishop .................................... 236/1 F |
| 3,345,540 | 10/1967 | Sutherland et al. .................. 361/334 |
| 3,444,399 | 5/1969 | Jones .................................. 219/210 X |
| 3,648,523 | 3/1972 | Kemper ................................. 73/361 |
| 3,690,177 | 9/1972 | Fluegel .................................. 73/361 |
| 3,986,082 | 10/1976 | Land ................................. 219/210 X |

FOREIGN PATENT DOCUMENTS 1562748  4/1969  France ........................................ 73/361

Primary Examiner—Volodymyr Y. Mayewsky
Attorney, Agent, or Firm—Monte F. Mott; John R. Manning; Paul F. McCaul

[57] ABSTRACT

An improved oven (10) for maintaining the junctions of a plurality of reference thermocouples at a common and contant temperature. The oven (10) is characterized by a cylindrical body (12) defining a heat sink having an axially extended cylindrical cavity (14), a singularized heating element comprising a unitary cylindrical heating element consisting of a resistance heating coil (20) wound about the surface of a metallic spool (18) having an axial bore (22) defined therein and seated in the cavity, an annular array of radially extended bores (30) defined in the cylindrical body (12) and a plurality of reference thermocouple junctions (32) seated in the bores in uniformly spaced relation with the heating element, and a temperature sensing device (28) seated in the axial bore for detecting temperature changes as they occur in the spool and circuit (46) for applying a voltage across the coil in response to detected drops in temperatures of the spool.

2 Claims, 4 Drawing Figures

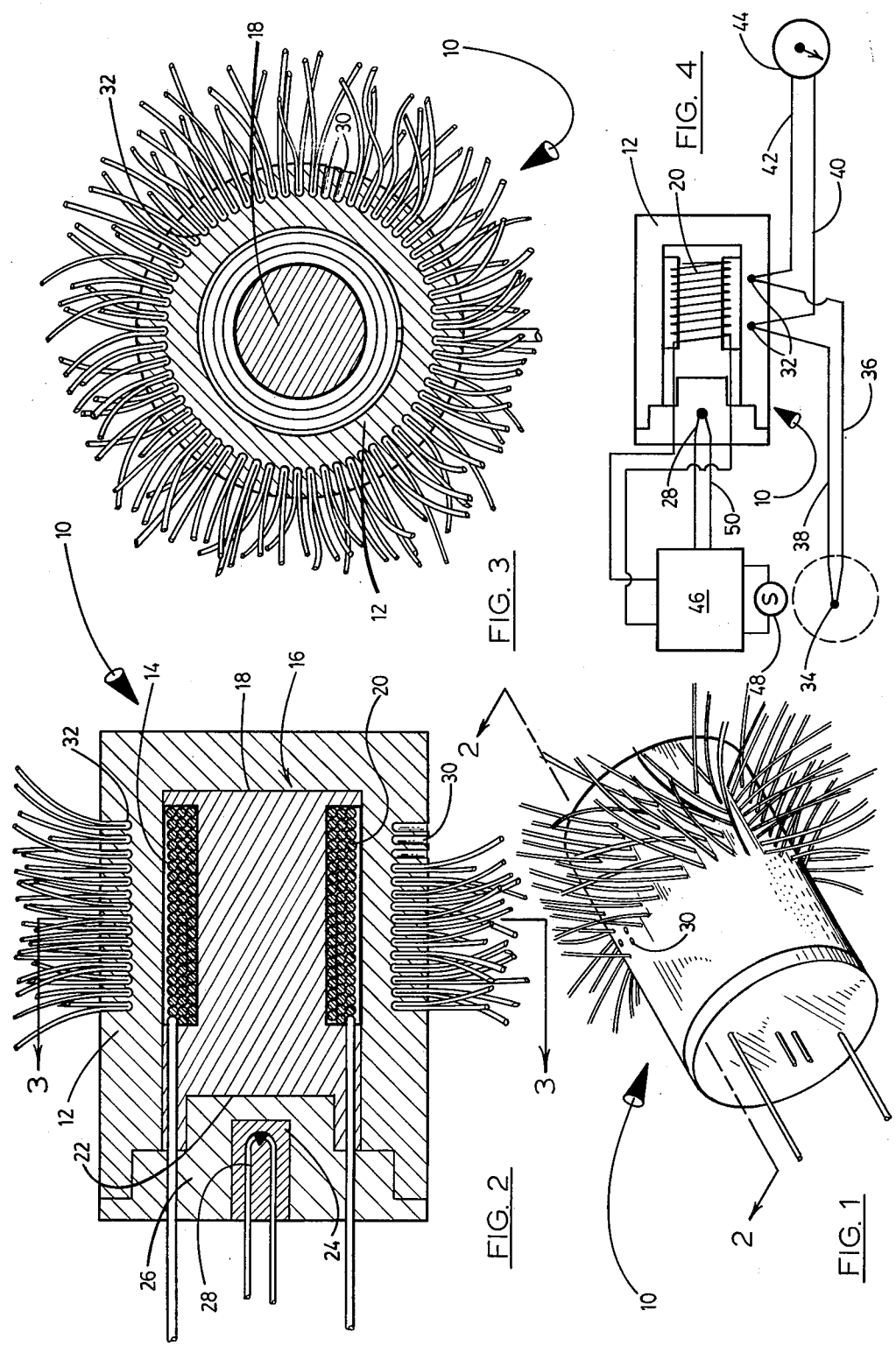

THERMOCOUPLE, MULTIPLE JUNCTION REFERENCE OVEN

ORIGIN OF THE INVENTION

The invention described herein was made in the performance of work by an employee of the United States Goverment and may be manufactured and used by or for the Goverment for Govermental purposes without the payment of any royalties thereon or therefor.

BACKGROUND OF THE INVENTION

1. Field of the Invention

The invention generally relates to a system including remotely related thermocouples employed in detecting and measuring temperatures by providing electrical output signals to be compared with the electrical output signals derived from reference thermocouples maintained at known temperatures, and more particularly to an improved oven for maintaining the junctions of a plurality of reference thermocouples at a common and constant temperature.

2. Description of the Prior Art

As is well known by those familiar with temperature measuring procedures commonly employed in industrial operations, such as are employed in the aerospace industry, thermocouples often are used to measure temperatures because of their relatively low cost and high reliability. Unfortunately, in order to provide for accurate measurements of temperature utilizing such devices, however, it is necessary to provide in combination therewith reference thermocouples maintained at constant temperatures throughout the duration of the temperature measuring operation in which the devices are employed.

Numerous devices have been proposed for use in heating reference thermocouples and many have been employed for this purpose. For example, see U.S. Pat. Nos. 2,559,571; 3,069,909; 3,345,540; and 3,648,523 which generally typify devices utilized in simultaneously heating the junctions of a multiplicity of reference thermocouples, herein referred to as a mulitple junction reference oven, or simply oven.

Heretofore, it has been common practice to provide in a multiple junction reference oven individual reference junctions displaced at uneven distances from a common source of heat. Alternatively, multiple heating elements are sometimes employed in heating the junctions. Such arrangements, of course, inherently result in temperature gradients being established between the various reference thermocouples with an attendent necessity that the gradients be, in some manner, taken into account or accommodated. Often, such requires the use of ovens of increased weight, size and complexity.

Moreover, in certain applications, such as in airborne data acquisition systems used in conducting flight tests, a relatively large number of temperature sensing thermocouples are required. Because of the inherent bulk and weight of the ovens of the prior art, as well as power requirements, limitations frequently are imposed on the number of reference junctions which can be accommodated, with an attendant reduction in the number of temperature sensing thermocouples which can be made available for a given test flight or similar operation.

It should therefore be apparent that there currently exists a need for a small, economic, and lightweight oven having capabilities for accommodating large numbers of thermocouple junctions, without temperature gradients being established between the various junctions employed to provide standard signals to which signals derived from temperature sensing thermocouples are compared.

It is therefore the general purpose of the instant invention to provide an improved oven for use in maintaining the junctions of reference thermocouples at constant temperatures in combination with a temperature sensing sytem characterized by a multiplicity of remotely related temperature sensing thermocouples.

OBJECTS AND SUMMARY OF THE INVENTION

It is an object of the instant invention to provide an improved oven for simultaneously controlling the temperature of a multiplicity of the junctions for reference thermocouples.

It is another object to provide an improved, multiple junction reference oven having a capability for accommodating an increased number of reference thermocouple junctions.

It is another object to provide a multiple junction reference oven particularly suited for maintaining an increased number of reference thermocouples at uniform temperatures.

It is another object to provide an improved, relatively small, lightweight, economical oven having enhanced capabilities for accommodating increased numbers of junctions for reference thermocouples, without an attendant reduction in operational accuracy.

These and other objects and advantages are achieved through a provision of an oven for heating reference thermocouples, said oven being characterized by a cylindrical body defining a heat sink having an axially extended cylindrical cavity, a singularized heating element comprising an unitary cylindrical heating element consisting of a resistance heating coil wound about the surface of a metallic spool having an axial bore defined therein and seated in said cavity, an annular array of radially extended bores defined in the cylindrical body and a plurality of reference thermocouple junctions seated in the bores in uniformly spaced relation with the heating element, and a temperature sensing device seated in the axial bore for detecting temperature changes as they occur in the spool and a circuit connected to the sensing device for applying a voltage across the coil in response to detected drops in the temperatures of the spool, as will become more readily apparent by reference to the following description in claims in light of the accompanying drawings.

DESCRIPTION OF THE DRAWINGS

FIG. 1 is a perspective view of an oven embodying the principles of the instant invention.

FIG. 2 is a cross-sectional view taken generally along lines 2—2 of FIG. 1.

FIG. 3 is a cross-sectional view taken generally along lines 3—3 of FIG. 2.

FIG. 4 is a schematic view depicting a circuit typifying one manner in which the reference oven shown in FIG. 1 may be connected for use in an operational environment.

DESCRIPTION OF THE PREFERRED EMBODIMENT

Referring now to the drawings, with more particularity, wherein like reference characters designate like or corresponding parts throughout the several views, there is shown in FIG. 1 an oven, generally designated 10, which embodies the principles of the instant invention.

The oven 10 includes a cylindrical wall 12, formed of a good thermal conductive material, such as brass or the like. Within the wall 12 there is provided a cylindrical cavity 14 having a substantially uniform diameter. The purpose of the cavity 14 is to receive in supporting relation an electrical resistance heater, generally designated 16. The heater 16 includes a spool 18, also formed of brass or similar material, about which is wound a cylindrical coil 20. As a practical matter, the coil is formed of a suitable wire and comprises a resistance heating element, in a manner fully understood by those familiar with such devices. It is important here to note that the spool 18 also includes an axial cavity 22 which serves to receive therein a temperature sensing pad 24. Preferably, the temperature sensing pad 24 is seated in a cap 26, provided as a closure member for the cavity 14.

As shown, the temperature sensing pad 24 includes a temperature sensing element 28 which, preferably, comprises a thermocouple. However, it is to be understood that any suitable temperature sensing device may be employed in lieu of the thermocouple depicted in the drawings. Moreover, it is to be understood that the cap 26 also is fabricated from a good thermal conductive material similar to that from which the wall 12 and spool 18 are fabricated. Consequently, the temperature of the spool 18 closely follows the temperature of the wall 12 and, because of the proximity and conductivity of the materials from which the spool and cap are fabricated, the sensing element 28 readily detects changes occuring in the temperature of the spool 18, and therefore, the temperature of the oven 10.

The wall 12 is provided with a large number of bores 30 extended radially into the wall 12. Preferably, the bores extend to a depth of approximately one-half the thickness of the wall 12 and collectively comprise an annular array circumscribing the external surface of the wall 12. Within each bore 30 there is seated a junction 32 of a reference thermocouple. Because of the cylindrical shape of the wall 12, the cavity 14, and the heater 16, a positioning of a large number of reference thermocouple junctions at a common distance from a common coil 20 is accommodated. Thus the temperature to which the thermocoupled junctions 32 are heated by an outwardly flowing thermal flux, comprises a temperature which is substantially common to all the junctions. Hence, the junctions 32 are heated with substantially no temperature gradient being established therebetween.

It is to be understood that the thermocouple junctions 32 are supported within the bores 30 by any suitable means, including a use of adhesives including epoxy and the like.

Referring for a moment to FIG. 4, there is depicted, for exemplary purposes, a temperature measuring circuit within which the oven 10 is connected. It can be seen that this circuit includes a junction 34 for a temperature sensing thermocouple. This junction is connected to a pair of junctions 32 for a pair of reference thermocouples through leads 36 and 38. As shown, the lead 36 is formed of chromel while the lead 38 is formed of alumel. Other types of thermocouple wire available can also be used. The leads 36 and 38, in turn, are connected at junction 32 with copper leads 40 and 42 for thus forming the thermocouple junctions 32 within the bores 30. The leads 40 and 42 are connected across a suitable volt meter, designated 44, for purposes fully understood by those familiar with the art.

Additionally, the coil 20 is connected via a suitable control circuit 46 to a suitable voltage source, designated 48. In practice, the control circuit 46 is connected to the sensing element 28 by leads 50 in order that the circuit between the voltage source 48 and the coil 20 may be opened and closed in response to electrical signals derived from the sensing element 28, generated in response to temperature changes occuring in the spool 18.

Since the details of the circuit shown in FIG. 4 form no part of the hereinafter claimed invention, and, further since the design and construction of the circuit is well within the skill of the art, a detailed description of the circuit is omitted in the interest of brevity. It suffices to understand that the output signal received from the thermocouple junction 34 is applied across the volt meter 44 via the thermocouple junctions 32, and that the temperature of the device 10 is controlled by the sensing device 28, the output of which initiates an opening and closing of the circuit 46 for selectively applying a voltage across the coil 20 in response to detected temperature changes occuring in the device.

The wall 12 of the over 10, in practice functions as a heat sink within which the reference thermocouple junctions 32 are seated in close proximity with the coil 20. As is well known, the direction of transfer of heat is always in a direction from hot to cold and the rate of transference is, for small differences, directly proportional to the differences in temperature. Hence, the flow of thermal flux from the coil 20 to the thermocouple junctions 32 will be substantially uniform, for most operational environments. Thus gradient between the junctions are substantially avoided during the operation of the oven 10. Moreover, the cylindrical shape of the wall 12, of course, makes it possible to accommodate large numbers of reference junctions without increasing the size, weight, or complexity of the oven, while the inclusion of the temperature sensing thermocouple 28 in close proximity with the spool 18 tends to assure early detection of changes in temperature occuring within the oven 10 so that corrective measures may be expedited.

Hence, in view of the foregoing, it is believed to be apparent that the instant invention provides a practical solution to many of the various problems heretofore encountered by those attempting to accommodate a large number of reference junctions, while utilizing a single oven.

What is claimed is:

1. An oven for maintaining the junction of a plurality of reference thermocouples at a substantially constant common temperature comprising:
   (A) a cylindrical body formed of thermally conductive material and having defined therein an axially extended cavity of a cylindrical configuration concentrically related to the body;
   (B) a spool of a substantially cylindrical configuration formed of thermally conductive stock material and having an annularly configured peripheral recess extended along a portion of the external surface of the spool and a cylindrical cavity extended axially into one end portion thereof;

(C) a disk-shaped cap formed of thermally conductive material closing said cavity for confining said spool therewithin, said cap being characterized by an integrally related cylindrical protuberance projected axially into the cavity extended axially into seated relation with the cavity extended axially into one end of said spool;

(D) an electrical resistence heating coil of a uniformly cylindrical configuration seated in the recess defined along the surface of the spool in an electrically insulated relationship with said body and said spool, and first circuit means connected to said coil for applying a voltage thereacross for electrically heating said body and said spool;

(E) temperature sensing means seated in said cap along the axial axis thereof in a position suitable for continuously monitoring the temperature of the spool for producing electrical signals indicative of the instantaneous temperature thereof;

(F) further circuit means connected to said temperature sensing means and said first circuit means for causing said first circuit means to apply a voltage across said coil in response to temperature drops occuring in said spool and detected by said temperature sensing means; and (G) an annular array of radially extended bores of common dimensions defined in the body at a common distance from said coil and a plurality of electrical reference thermocouple junctions seated in said bores in uniformly spaced relation with said coil, each of said junctions being electrically insulated from said body and adapted to be connected in a temperature sensing circuit.

2. An oven as defined in claim 1 wherein said body, spool and cap are machined from a common thermally conductive metal.

* * * * *